(12) United States Patent
Yun et al.

(10) Patent No.: US 11,912,222 B2
(45) Date of Patent: Feb. 27, 2024

(54) VEHICLE PANEL ASSEMBLY

(71) Applicants: Kia Corporation, Seoul (KR); Hyundai Motor Company, Seoul (KR)

(72) Inventors: Hyun Cheol Yun, Seoul (KR); Dong Ho Kang, Yongin-si (KR); Jin Young Mo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/049,311

(22) Filed: Oct. 25, 2022

(65) Prior Publication Data

US 2023/0303023 A1 Sep. 28, 2023

(30) Foreign Application Priority Data

Mar. 10, 2022 (KR) .......................... 10-2022-0030259

(51) Int. Cl.
*B60R 21/04* (2006.01)

(52) U.S. Cl.
CPC .. *B60R 21/0428* (2013.01); *B60R 2021/0435* (2013.01)

(58) Field of Classification Search
CPC ........ B60R 21/0428; B60R 2021/0435; B60R 2011/004; B60R 2011/0042; B60R 2011/0059; B62D 24/00; B62D 25/02; B62D 25/06; B62D 25/2036; B62D 23/00; B62D 23/005; B62D 65/02; B62D 65/06; B62D 65/16

USPC .......................................................... 296/191
See application file for complete search history.

(56) References Cited

U.S. PATENT DOCUMENTS

| | | | |
|---|---|---|---|
| 6,168,231 B1 * | 1/2001 | Fielding ............... | B62D 29/043 296/210 |
| 2018/0265138 A1 * | 9/2018 | Nakayama ........... | B62D 27/023 |
| 2022/0204099 A1 * | 6/2022 | Cho ...................... | B62D 33/077 |

FOREIGN PATENT DOCUMENTS

| | | | | |
|---|---|---|---|---|
| JP | 62088674 A | * | 4/1987 | ............. B62D 21/02 |
| KR | 20200122605 A | | 10/2020 | |
| WO | WO-0181155 A2 | * | 11/2001 | ........... B62D 23/005 |

* cited by examiner

*Primary Examiner* — Paul N Dickson
*Assistant Examiner* — Matthew D Lee
(74) *Attorney, Agent, or Firm* — Slater Matsil, LLP (57) ABSTRACT

An embodiment vehicle panel assembly includes an inner panel configured to wrap a roof and opposite pillars of a vehicle body, the inner panel including a second inner assembly portion provided at pillar-side opposite side parts and a guide portion provided at an upper side of the second inner assembly portion, and an outer panel configured to be loaded from above the inner panel and coupled to the inner panel to wrap an outside of the inner panel, the outer panel including a second outer assembly portion provided at a side part, the second outer assembly portion configured to be guided downwards by the guide portion when loaded from above and facing the second inner assembly portion after loading, wherein the second outer assembly portion is fastened to the second inner assembly portion.

20 Claims, 10 Drawing Sheets

VEHICLE PANEL ASSEMBLY

CROSS-REFERENCE TO RELATED APPLICATIONS

This application claims the benefit of Korean Patent Application No. 10-2022-0030259, filed on Mar. 10, 2022, which application is hereby incorporated herein by reference.

TECHNICAL FIELD

The present invention relates to a panel assembly.

BACKGROUND

A general vehicle body is produced by machining and welding parts through pressing using a press die, whereby large-scale facilities, such as a press plant, a vehicle body welding plant, and a painting shop, are required, and design freedom is low.

In particular, many changes in design of a conventional vehicle body are required at the time of small quantity batch production, whereby the number of press dies is greatly increased, and therefore manufacturing cost is increased.

In order to respond to recent rapidly changed market environments and customer needs, it is necessary to simplify the production of a vehicle and to minimize the development period thereof.

Consequently, there is a need for a vehicle body structure having improved assembly efficiency in a smart factory environment while being capable of responding to various designs.

The matters disclosed in this section are merely for enhancement of understanding of the general background of embodiments of the invention and should not be taken as an acknowledgment or any form of suggestion that the matters form the related art already known to a person skilled in the art.

SUMMARY

The present invention relates to a panel assembly. Particular embodiments relate to an inner panel and outer panel assembly coupled to an upper body of a vehicle body.

Embodiments of the present invention can solve problems in the art, and an embodiment of the present invention couples an inner panel outside a vehicle body constituted by a plurality of pipes and couples an outer panel outside the inner panel.

An embodiment of the present invention provides a vehicle panel assembly coupled outside a roof and opposite pillars of a vehicle body, the vehicle panel assembly including an inner panel formed so as to wrap the roof and the opposite pillars of the vehicle body, the inner panel including a first inner assembly portion formed at a roof-side upper part, a second inner assembly portion formed at pillar-side opposite side parts, and a guide portion formed at an upper side of the second inner assembly portion, and an outer panel coupled to the inner panel so as to wrap an outside of the inner panel as the result of being loaded from above the inner panel, the outer panel including a first outer assembly portion formed at an upper part, the first outer assembly portion being fastened to the first inner assembly portion, and a second outer assembly portion formed at a side part, the second outer assembly portion being guided downwards by the guide portion when loaded from above and facing the second inner assembly portion after loading, whereby the second outer assembly portion is fastened to the second inner assembly portion.

The first inner assembly portion may be provided with a first insertion recess, and the first outer assembly portion may include a first coupling protrusion configured to be inserted into and coupled to the first insertion recess.

A first inclined portion having a width decreased in an extension direction may be formed at the first coupling protrusion, whereby the first coupling protrusion may be inserted into and coupled to the first insertion recess along the first inclined portion.

The guide portion and the second inner assembly portion may be integrally formed, whereby the second outer assembly portion separated downwards from the guide portion as the result of sliding therefrom may be located so as to correspond to the second inner assembly portion.

The second inner assembly portion may be provided on a lower end thereof with a projecting portion formed so as to project outwards, whereby the second outer assembly portion loaded by the guide portion and separated downwards may be prevented from being separated under the second inner assembly portion.

The upper part and the side part of the outer panel may be integrally formed, and the outer panel may be made of a material configured such that the side part and the upper part of the outer panel are widened from each other by a predetermined angle or more.

The guide portion and the second inner assembly portion may be formed at a side surface of an inner plate in an upward-downward direction in plural, and the guide portion and the second inner assembly portion located below may project outwards farther than the guide portion and the second inner assembly portion located above.

The guide portion may be provided with a guide groove depressed in a sliding direction of the second outer assembly portion extending outwards, and the second outer assembly portion may be inserted into the guide groove and may be slid therealong.

The second inner assembly portion may be provided with a second insertion recess, and the second outer assembly portion may include a second coupling protrusion configured to be inserted into and coupled to the second insertion recess.

The second coupling protrusion may be provided with a second inclined portion having a width decreased in an extension direction and a depressed portion formed at an end of the second inclined portion so as to be depressed inwards, and the second coupling protrusion may be inserted into the second insertion recess along the second inclined portion and may be caught by the depressed portion, whereby catching coupling may be achieved.

The second outer assembly portion may be provided with an elastic rib extending inwards from an inside of the depressed portion, the elastic rib being configured to apply elastic force to the depressed portion located outside thereof.

The second outer assembly portion may be provided with a restriction portion extending from an end of the depressed portion in a direction intersecting an extension direction of the second outer assembly portion, the restriction portion being configured to restrict insertion of the second outer assembly portion.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Specific structural or functional descriptions of the embodiments of the present invention disclosed in this specification or this disclosure are given only for illustrating embodiments of the present invention. Embodiments of the present invention may be realized in various forms, and should not be interpreted to be limited to the embodiments of the present invention disclosed in this specification or this disclosure.

Since the embodiments of the present invention may be variously modified and may have various forms, specific embodiments will be shown in the drawings and will be described in detail in this specification or this disclosure. However, the embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by embodiments of the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to," must be interpreted in the same manner.

The terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Reference will now be made in detail to the preferred embodiments of the present invention, examples of which are illustrated in the accompanying drawings. Wherever possible, the same reference numbers will be used throughout the drawings to refer to the same or like parts.

A relatively long manufacturing process and a relatively high manufacturing cost are required to provide a suspension, an exterior material, an interior material, a steering device, and a safety device to a conventional vehicle, in which a passenger rides, in consideration of driving comfort, safety specifications, aesthetics, and driving performance for the passenger. In addition, purpose-specific vehicles must be individually manufactured, and it is impossible to manufacture customized vehicles for all purposes.

A vehicle to which technology according to embodiments of the present invention is applied is a purpose built vehicle (PBV), specifically a business vehicle having various commercial purposes, such as logistics, food trucks, delivery, and service provision. In an embodiment shown, there is provided a vehicle that transports only cargo in a state of being loaded therein without passenger boarding, that is driven through an autonomous driving system, and that is used for unmanned delivery/logistics/transportation of cargo or food as a representative case.

The structure of the vehicle according to embodiments of the present invention may be simplified, and therefore design and manufacture of the vehicle may be simplified. Parts of the vehicle may be modularized so as to be commonly used, whereby cost may be reduced and supply of parts is easy. In addition, the modularized parts of the vehicle may be coupled to each other through an environmentally friendly smart factory production method using only mechanical coupling, such as bolting or riveting, which does not require a press process, a vehicle body welding process, and a painting process, whereby the vehicle may be completed.

In embodiments of the present invention, the vehicle body may be constituted by a plurality of pipes in order to reduce manufacturing cost. Pipes can be manufactured through extrusion or roll forming, whereby manufacturing cost is low. When pipes are coupled to each other or when the pipes are coupled to other panels, however, it is necessary to increase coupling strength. In embodiments of the present invention, therefore, a coupling member 20 configured to close an open end of a vehicle body pipe is provided such that the end of the vehicle body pipe can be strongly coupled to another pipe or a panel, whereby deformation of the open end of the vehicle body pipe is inhibited by the coupling member 20, and a coupling surface 21 having formed therein a coupling hole 21a for coupling to another construction is provided.

Figure 9:
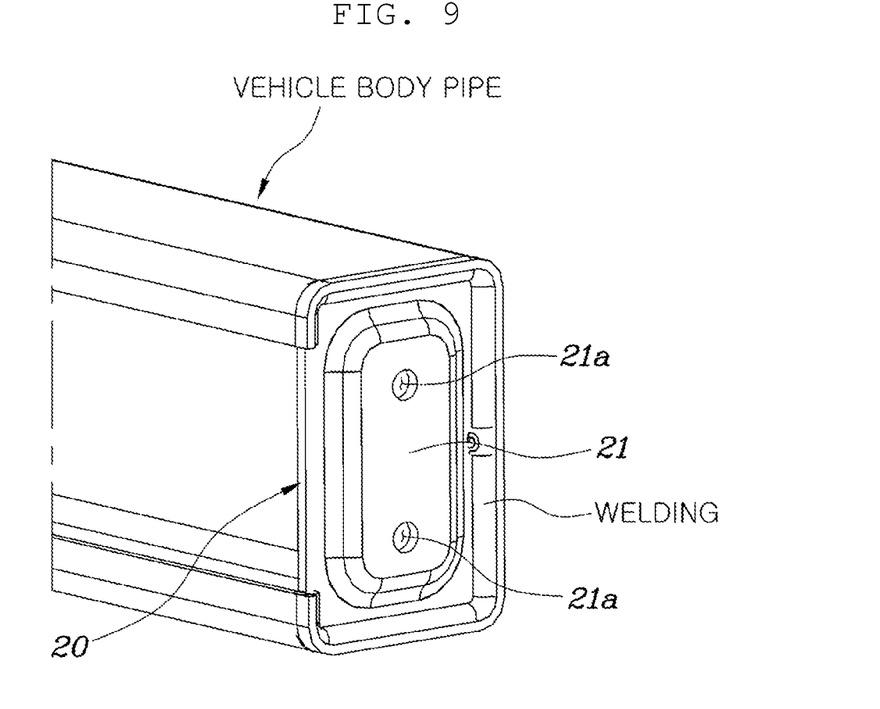
FIG. 9 is a perspective view showing that a coupling member is coupled to an end of a vehicle body pipe according to an embodiment of the present invention.

FIG. 9 is a perspective view showing that a coupling member 20 is coupled to an end of a vehicle body pipe according to an embodiment of the present invention. As shown in FIG. 9, the coupling member 20 is welded to the end of the pipe in a state of being spaced apart inwards therefrom in a longitudinal direction of the pipe, and welding beads are disposed in a space formed as the result of the coupling member 20 being spaced apart inwards from the end of the pipe, whereby lapping of the welding beads is omitted, and therefore integration with the coupling member 20 is simplified. In the structure in which the pipe according to embodiments of the present invention and the coupling member 20 are integrated, the vehicle body may be easily assembled through only mechanical coupling, such as bolting or riveting, in an environmentally friendly smart factory. Since welding is unnecessary, the process is environmentally friendly. In addition, when an accident occurs or maintenance is necessary, it is possible to easily replace some members of the vehicle body. Furthermore, various kinds of vehicles may be easily assembled and produced.

The vehicle to which embodiments of the present invention are applied may be divided into a business area located above, in which cargo is loaded, and a drive area located below, which takes charge of driving of the vehicle. The business area may be variously changed depending on customer demand, and the drive area may be variously changed depending on driving conditions of the vehicle.

The vehicle according to the embodiment shown is basically designed to have a structure in which a door is open from only one side to open a space in which cargo can be loaded, and the business area may be designed in various shapes depending on customer demand.

An upper body of the vehicle according to embodiments of the present invention constitutes a vehicle body located in the business area of the vehicle for the unmanned delivery system.

The upper body and a lower body may be assembled with each other through a plurality of pipe-shaped members by bolting, whereby manufacture, repair, and rebuilding thereof may be easy. A lower part of the upper body may constitute a floor, and a driving motor, wheels, a suspension, and a battery may be loaded in the lower body. In addition, an additional battery may be loaded or a cargo space may be defined in the middle of the lower body. The upper body and the lower body may be individually assembled and fastened to each other in a vertical direction to constitute a body of a completed vehicle. Consequently, the upper body and the lower body may be assembled in various combinations.

A vehicle panel assembly according to embodiments of the present invention may include an inner panel 200 coupled to the upper body formed using the pipes, as described above, and an outer panel 100 assembled outside the inner panel 200.

Figure 1:
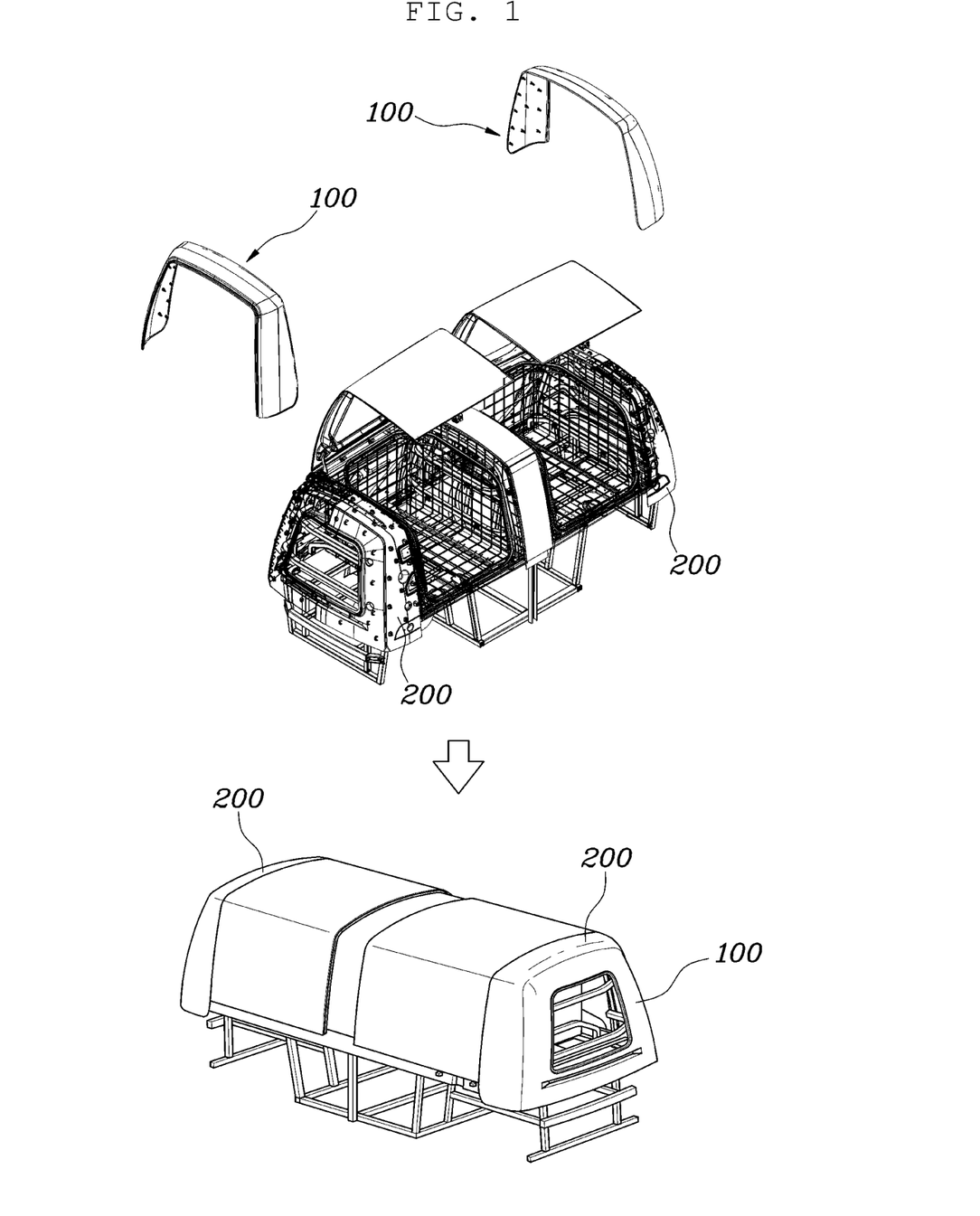
FIG. 1 is a perspective view showing assembly of a vehicle panel assembly according to an embodiment of the present invention.
Figure 2:
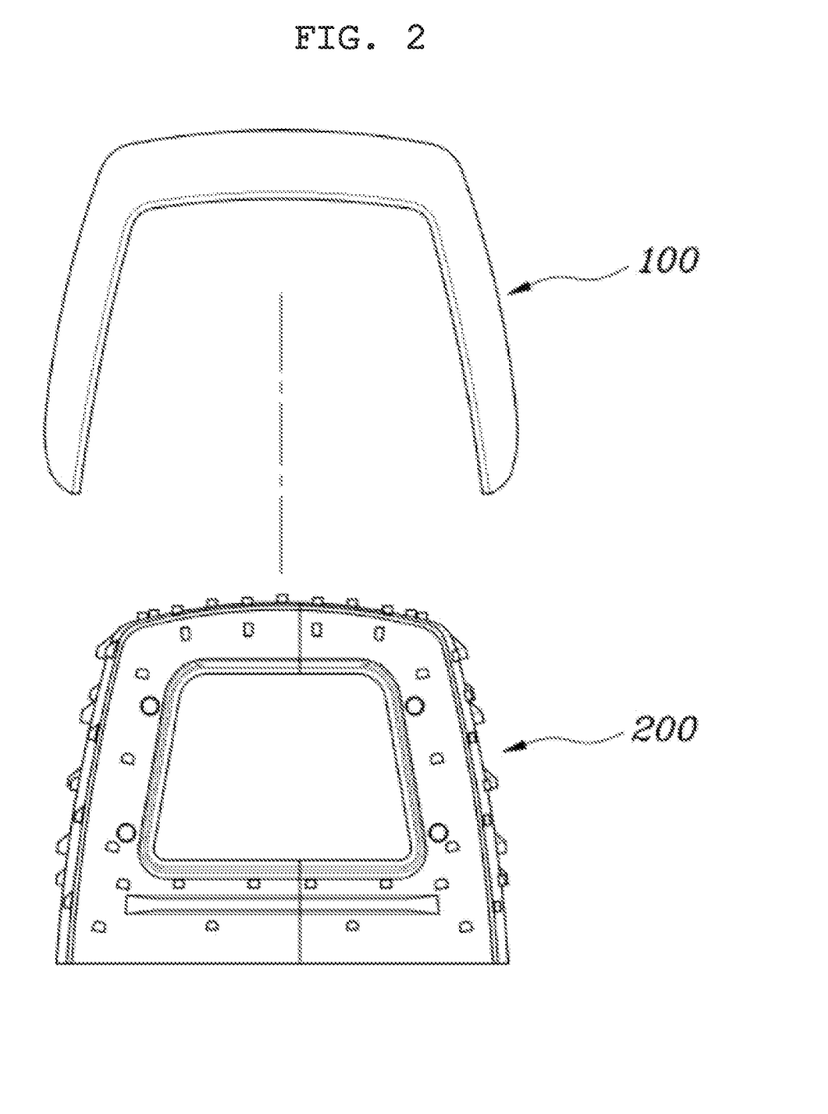
FIG. 2 is a front view showing assembly of the vehicle panel assembly according to an embodiment of the present invention.
Figure 3:
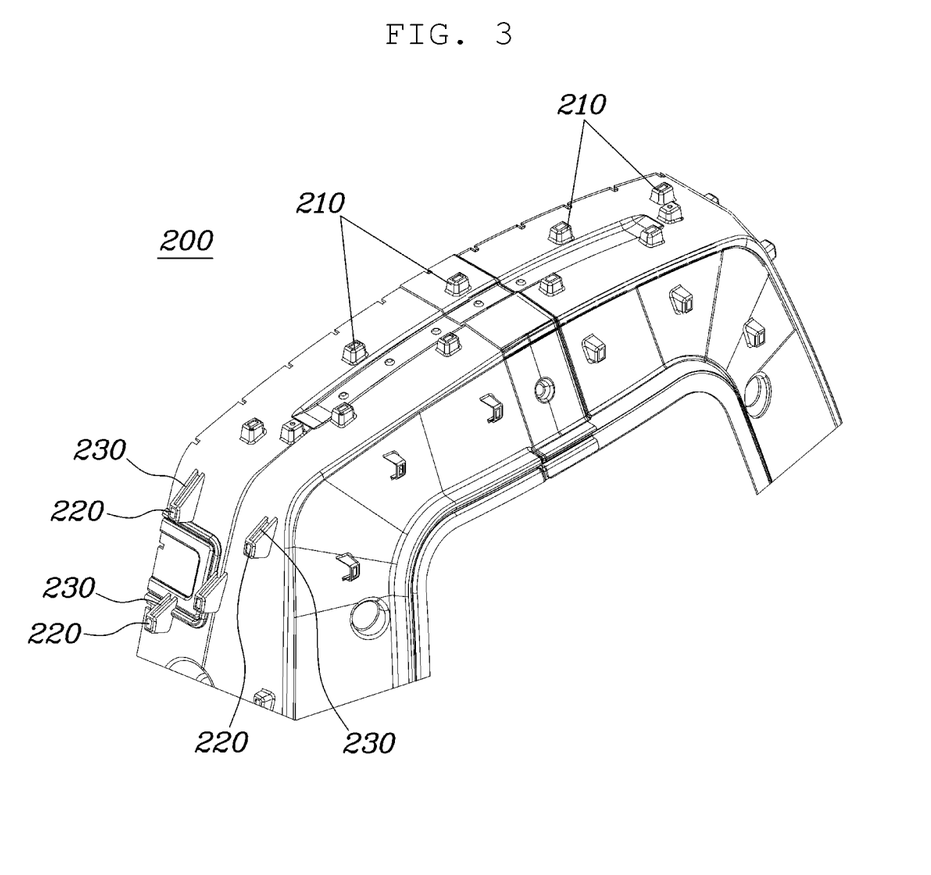
FIG. 3 is a perspective view of an inner panel of the vehicle panel assembly according to an embodiment of the present invention.
Figure 4:
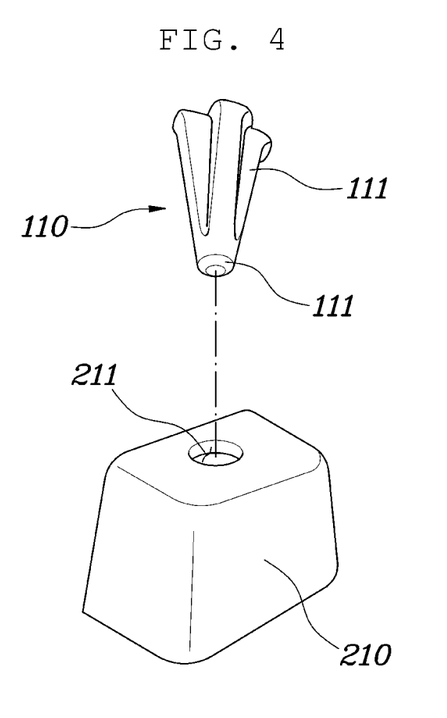
FIG. 4 is a perspective view of a first inner assembly portion and a first outer assembly portion of the vehicle panel assembly according to an embodiment of the present invention.
Figure 5:
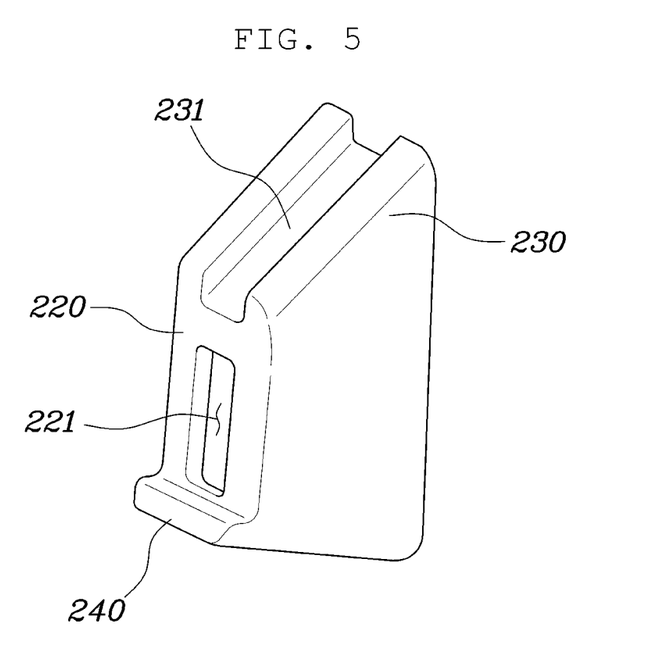
FIG. 5 is a perspective view of a second inner assembly portion of the vehicle panel assembly according to an embodiment of the present invention.
Figure 6:
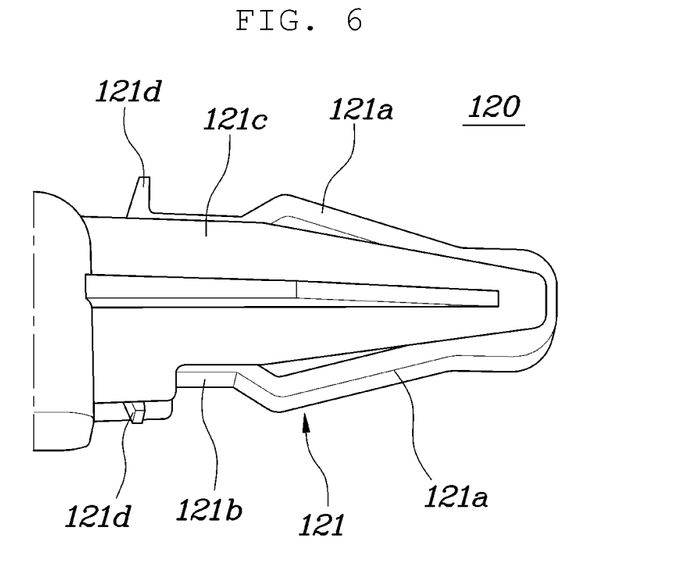
FIG. 6 is a perspective view of a second outer assembly portion of the vehicle panel assembly according to an embodiment of the present invention.

FIG. 1 is a perspective view showing assembly of a vehicle panel assembly according to an embodiment of the present invention, FIG. 2 is a front view showing assembly of the vehicle panel assembly according to an embodiment of the present invention, FIG. 3 is a perspective view of an inner panel 200 of the vehicle panel assembly according to an embodiment of the present invention, FIG. 4 is a perspective view of a first inner assembly portion 210 and a first outer assembly portion 110 of the vehicle panel assembly according to an embodiment of the present invention, FIG. 5 is a perspective view of a second inner assembly portion 220 of the vehicle panel assembly according to an embodiment of the present invention, and FIG. 6 is a perspective view of a second outer assembly portion 120 of the vehicle panel assembly according to an embodiment of the present invention.

A vehicle panel assembly according to embodiments of the present invention will be described with reference to FIGS. 1 to 6.

The vehicle panel assembly according to embodiments of the present invention, which is coupled outside a roof and opposite pillars of a vehicle body, includes an inner panel 200 formed so as to wrap the roof and the opposite pillars of the vehicle body, the inner panel 200 including a first inner assembly portion 210 formed at a roof-side upper part, a second inner assembly portion 220 formed at pillar-side opposite side parts, and a guide portion 230 formed at an upper side of the second inner assembly portion 220, and an outer panel 100 coupled to the inner panel 200 so as to wrap an outside of the inner panel 200 as the result of being loaded from above the inner panel 200, the outer panel 100 including a first outer assembly portion 110 formed at an upper part, the first outer assembly portion 110 being fastened to the first inner assembly portion 210, and a second outer assembly portion 120 formed at a side part, the second outer assembly portion 120 being guided downwards by the guide portion 230 when loaded from above and facing the second inner assembly portion 220 after loading, whereby the second outer assembly portion 120 is fastened to the second inner assembly portion 220.

As shown in FIGS. 1 and 2, the vehicle body may project upwards and may be bent from a front and a rear thereof, whereby the opposite pillars and the roof may be formed. The inner panel 200 may be located at the front and the rear of the vehicle body, and may be formed so as to wrap the opposite pillars, the roof, and a front part of the vehicle body disposed at the front and the rear of the vehicle body. Two panels may be coupled to each other in order to form the inner panel 200.

The outer panel 100 may be loaded downwards from above the inner panel 200, and may be coupled to the inner panel 200. The first inner assembly portion 210 may be formed at a roof part of the inner panel 200, and the first outer assembly portion 110 may be formed at the position of the outer panel 100 corresponding to the first inner assembly portion 210. The first inner assembly portion 210 and the first outer assembly portion 110 may be coupled to each other by fitting, whereby the roof part of the inner panel 200 and a roof part of the outer panel 100 may be coupled to each other.

A side part of the outer panel 100 may be loaded downwards from above and may be coupled to a side part of the inner panel 200 so as to cover the side part of the inner panel 200. At this time, the second outer assembly portion 120 may be formed at an inner surface of the side part of the outer panel 100, and the second inner assembly portion 220 may be formed at the side part of the inner panel 200 so as to correspond to the second outer assembly portion 120, whereby the second outer assembly portion 120 and the second inner assembly portion 220 may be coupled to each other by fitting.

At this time, the first outer assembly portion 110 is coupled to the first inner assembly portion 210 before the second outer assembly portion 120 and the second inner assembly portion 220 are coupled to each other by fitting. Consequently, the second outer assembly portion 120 and the second inner assembly portion 220 are coupled to each other by fitting in the state in which the position of the outer panel 100 is regulated, whereby coupling accuracy is improved.

As a result, the side part of the inner panel 200 and the side part of the outer panel 100 may be coupled to each other by fitting without a separate coupling member.

The guide portion 230, which contacts the second outer assembly portion 120 such that the second outer assembly portion 120 loaded from above is accurately located at the second inner assembly portion 220 and which guides loading of the second outer assembly portion 120, may be formed at the upper side of the second inner assembly portion 220. Consequently, the second outer assembly portion 120 may be loaded downwards from above while being guided by the guide portion 230, may be located at the second inner assembly portion 220, and may be coupled to the second inner assembly portion 220 by manipulation of a worker.

When the outer panel 100 is loaded downwards so as to be assembled with the inner panel 200, the first outer assembly portion 110 contacts the first inner assembly portion 210, whereby the position of the outer panel 100 in a leftward-rightward direction may be regulated at the time of assembly between the outer panel 100 and the inner panel 200. When the outer panel 100 is further loaded downwards, the second outer assembly portion 120 may be guided by the guide portion 230, whereby loading of the outer panel 100 is guided, and the outer panel 100, which is made of a synthetic resin, may be widened by elasticity thereof, and therefore the second outer assembly portion 120 may be exactly located at the position of the second inner assembly portion 220. Subsequently, the second outer assembly portion 120 may be coupled to the second inner assembly portion 220 by external force, and the outer panel 100 may return to the original shape thereof due to elasticity thereof. Consequently, work convenience and work efficiency may be improved when the worker couples the inner panel 200 and the outer panel 100 to each other.

A first insertion recess 211 may be formed in the first inner assembly portion 210, and the first outer assembly portion 110 may include a first coupling protrusion 111 configured to be inserted into and coupled to the first insertion recess 211.

As shown in FIG. 3, the first insertion recess 211 may be formed in the first inner assembly portion 210, and the first coupling protrusion 111, which protrudes so as to be inserted into the first insertion recess 211, may be formed on the first outer assembly portion 110, whereby the first coupling protrusion in may be inserted into the first insertion recess 211, and therefore the first inner assembly portion 210 and the first outer assembly portion 110 may be coupled to each other.

As a result, the first inner assembly portion 210 and the first outer assembly portion 110 may be coupled to each other by fitting without a separate coupling member, such as a bolt or a rivet, and the position of the outer panel 100 may be regulated when the outer panel is loaded downwards from above the inner panel 200.

A first inclined portion 111a having a width decreased in an extension direction may be formed at the first coupling protrusion 111, whereby the first coupling protrusion 111 may be inserted into and coupled to the first insertion recess 211 along the first inclined portion 111a.

As shown in FIG. 3, the first inclined portion 111a, which is inclined so as to have a sectional size decreased toward an end thereof, may be formed at the first coupling protrusion 111, whereby the first coupling protrusion 111 may be inserted into the first insertion recess 211 along the first inclined portion 111a.

Subsequently, the first coupling protrusion 111 may be fitted in and fixed to the first insertion recess 211 after insertion, since the sectional size of the first coupling protrusion 111 is increased.

The guide portion 230 and the second inner assembly portion 220 may be integrally formed, whereby the second outer assembly portion 120 separated downwards from the guide portion 230 as the result of sliding therefrom may be located so as to correspond to the second inner assembly portion 220.

As shown in FIGS. 3 and 5, the guide portion 230 and the second inner assembly portion 220 may be integrally formed.

When the inner panel 200 is made of a synthetic resin, the guide portion 230 and the second inner assembly portion 220 may be easily integrally formed by molding. Since the guide portion 230 and the second inner assembly portion 220 are integrally formed, manufacturing cost may be reduced.

In addition, the second outer assembly portion 120, downward loading of which has been guided by the guide portion 230, may be located at the second inner assembly portion 220 immediately upon separation from the guide portion 230.

A projecting portion 240 may be formed on a lower end of the second inner assembly portion 220 so as to project outwards, whereby the second outer assembly portion 120 loaded by the guide portion 230 and separated downwards may be prevented from being separated under the second inner assembly portion 220.

As shown in FIGS. 3 and 5, the projecting portion 240 may be formed so as to project outwards from a lower part of the second inner assembly portion 220.

The second outer assembly portion 120, downward loading of which has been guided by the guide portion 230, may be separated from the guide portion 230, may be moved downwards, and may be located at a position corresponding to the second inner assembly portion 220.

At this time, when the second outer assembly portion 120 is moved downwards farther than the second inner assembly portion 220, the second outer assembly portion 120 and the second inner assembly portion 220 may not be normally coupled to each other.

In order to prevent such a problem, the projecting portion 240, which projects from the lower part of the second inner assembly portion 220, may support the second outer assembly portion 120 that is moved downwards, whereby the second outer assembly portion 120 and the second inner assembly portion 220 may be located at corresponding positions.

Subsequently, the second outer assembly portion 120 and the second inner assembly portion 220 may be coupled to each other by manipulation of the worker, as needed.

The upper part and the side part of the outer panel 100 may be integrally formed, and the outer panel 100 may be made of a material configured such that the side part and the upper part of the outer panel 100 are widened from each other by a predetermined angle or more.

As shown in FIGS. 1 and 2, the upper part and the side part of the outer panel 100 may be integrally formed, whereby the outer panel 100 may be formed in an inverted U shape. The outer panel 100 may be loaded downwards from above the inner panel 200, and may be made of a material configured such that the side part and the upper part are widened from each other by a predetermined angle or more, whereby loading of the second outer coupling portion of the side part is guided by the guide portion 230.

In an embodiment, the outer panel 100 may be made of a synthetic resin. As a result, the side part of the outer panel 100 may be widened from the upper part by a predetermined angle or more.

In addition, since the upper part and the side part of the outer panel 100 are integrally formed, no fitting line may be formed between the upper part and the side part, whereby aesthetics may be improved. Furthermore, since no fitting line is formed, introduction of foreign matter into the vehicle may be prevented.

In addition, since the upper part and the side part of the outer panel 100 are integrally formed, the number of parts may be reduced, whereby cost reduction may be achieved and work efficiency may be improved. In addition, the outer panel 100 may be assembled with the inner panel 200 without division of the outer panel.

The guide portion 230 and the second inner assembly portion 220 may be formed at a side surface of an inner plate in an upward-downward direction in plural, and the guide portion 230 and the second inner assembly portion 220 located below may project outwards farther than the guide portion 230 and the second inner assembly portion 220 located above.

As shown in FIGS. 2 and 3, the guide portion 230 and the second inner assembly portion 220 may be disposed at the side part of the inner panel 200 in the upward-downward direction in plural.

The width of a lower part of the side part of the inner panel 200 may be greater than the width of an upper part of the side part of the inner panel 200. As a result, the guide portion 230 and the second inner assembly portion 220 located below may project farther than the guide portion 230 and the second inner assembly portion 220 located above, whereby downward loading of a plurality of second outer assembly portions 120 may be guided by the guide portions 230 corresponding to respective positions thereof, and therefore the second outer assembly portions 120 may be inserted into the second inner assembly portions 220, respectively.

As a result, the outer panel 100 and the inner panel 200 may be assembled with each other at an exact position.

A guide groove 231, which is depressed in a sliding direction of the second outer assembly portion 120 and extends outwards, may be formed in the guide portion 230, and the second outer assembly portion 120 may be inserted into the guide groove 231 and may be slid therealong.

The guide portion 230 is formed so as to be inclined downward in order to guide the second outer assembly portion 120 loaded downwards, and the guide groove 231, which is depressed so as to be inclined downwards, may be formed in the guide portion 230.

Figure 8:
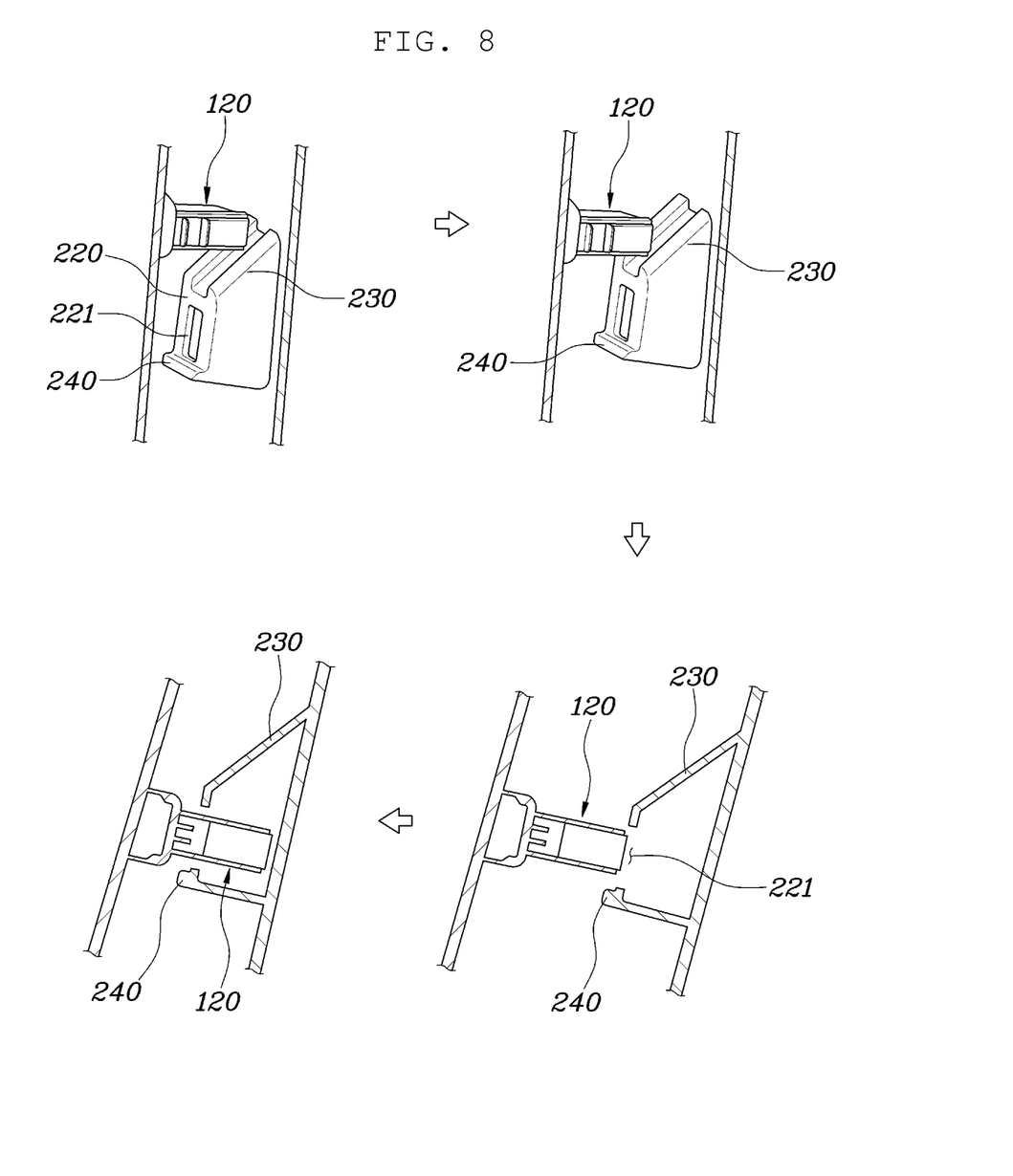
FIG. 8 is a view showing coupling between the second inner assembly portion and the second outer assembly portion of the vehicle panel assembly according to an embodiment of the present invention.

FIG. 8 is a view showing coupling between the second inner assembly portion 220 and the second outer assembly portion 120 of the vehicle panel assembly according to an embodiment of the present invention.

Referring further to FIG. 8, when inserted into the guide groove 231 so as to be loaded downwards, the second outer assembly portion 120 may be slid in the guide groove 231 along the inclination thereof and may be located so as to correspond to the second inner assembly portion 220. Since the second outer assembly portion 120 is inserted into the guide groove 231, movement of the second outer assembly portion 120 in the forward-rearward direction of the vehicle may be inhibited, whereby the second outer assembly portion 120 may be accurately positioned.

A second insertion recess 221 may be formed in the second inner assembly portion 220, and the second outer assembly portion 120 may include a second coupling protrusion 121 configured to be inserted into and coupled to the second insertion recess 221.

As shown in FIGS. 5 and 6, the second insertion recess 221 may be formed in the second inner assembly portion 220, and the second coupling protrusion 121, which protrudes so as to be inserted into the second insertion recess 221, may be formed on the second outer assembly portion 120, whereby the second coupling protrusion 121 may be inserted into the second insertion recess 221, and therefore the second inner assembly portion 220 and the second outer assembly portion 120 may be coupled to each other.

As a result, the second inner assembly portion 220 and the second outer assembly portion 120 may be coupled to each other by fitting without a separate coupling member, such as a bolt or a rivet.

Figure 7:
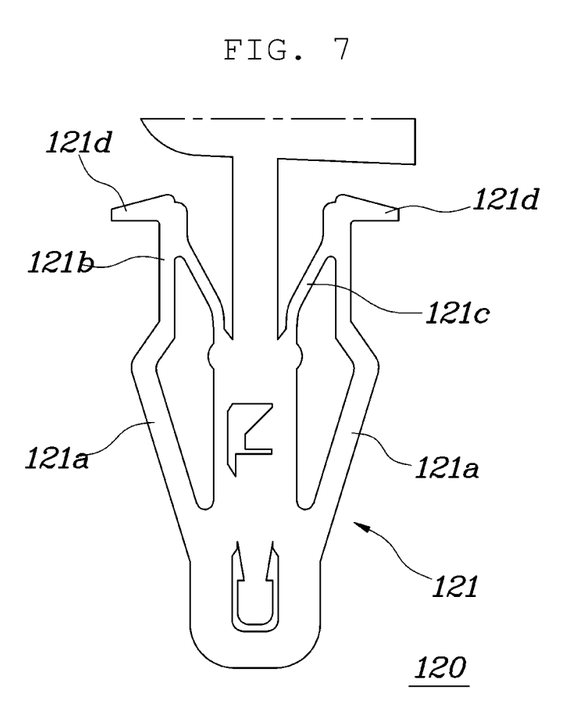
FIG. 7 is a sectional view of the second outer assembly portion of the vehicle panel assembly according to an embodiment of the present invention.

FIG. 7 is a sectional view of the second outer assembly portion 120 of the vehicle panel assembly according to an embodiment of the present invention.

A second inclined portion 121*a* having a width decreased in an extension direction may be formed at the second coupling protrusion 121, and a depressed portion 121*b* may be formed at an end of the second inclined portion 121*a* so as to be depressed inwards, whereby the second coupling protrusion 121 may be inserted into to the second insertion recess 221 along the second inclined portion 121*a* and may be caught by the depressed portion 121*b*, whereby catching coupling may be achieved.

As shown in FIG. 7, the second inclined portion 121*a*, which is inclined toward an end of the second outer assembly portion 120, and the depressed portion 121*b*, which is depressed from an end of the second inclined portion 121*a* toward the center of the second outer assembly portion 120, may be formed at the second outer assembly portion 120. The second inclined portion 121*a* may be inserted into the second inner assembly portion 220, and the second inner assembly portion 220 may be caught by the depressed portion 121*b*, whereby the second inner assembly portion 220 and the second outer assembly portion 120 may be coupled to each other.

As a result, the second outer assembly portion 120 may be fixed to the second inner assembly portion 220 in a state of being inserted therein, whereby the second outer assembly portion 120 may be prevented from being separated from the second inner assembly portion 220.

An elastic rib 121*c* extending inwards from an inside of the depressed portion 121*b* to apply elastic force to the depressed portion 121*b* located outside thereof may be formed at the second outer assembly portion 120.

As shown in FIG. 7, the elastic rib 121*c*, which diagonally extends toward a central part of the second outer assembly portion 120, may be formed at the inside of the depressed portion 121*b* in order to apply elastic force to the depressed portion 121*b*. When the second coupling protrusion 121 is inserted into the second insertion recess 221 and the second inner assembly portion 220 is caught by the depressed portion 121*b*, the elastic rib 121*c* may apply elastic force to the depressed portion 121*b*, whereby the second outer assembly portion 120 may be fixed.

A restriction portion 121*d* extending from an end of the depressed portion 121*b* in a direction intersecting an extension direction of the second outer assembly portion 120 to restrict insertion of the second outer assembly portion 120 may be formed at the second outer assembly portion 120.

The restriction portion 121*d* may extend outwards from the end of the depressed portion 121*b* to prevent further insertion of the second coupling protrusion 121 into the second insertion recess 221, whereby shaking of the side part of the outer panel 100 in a state of being coupled to the inner panel 200 may be prevented.

The shape of the second outer assembly portion 120, which constitutes an embodiment, may be applied to the first outer assembly portion 110.

Figure 10:
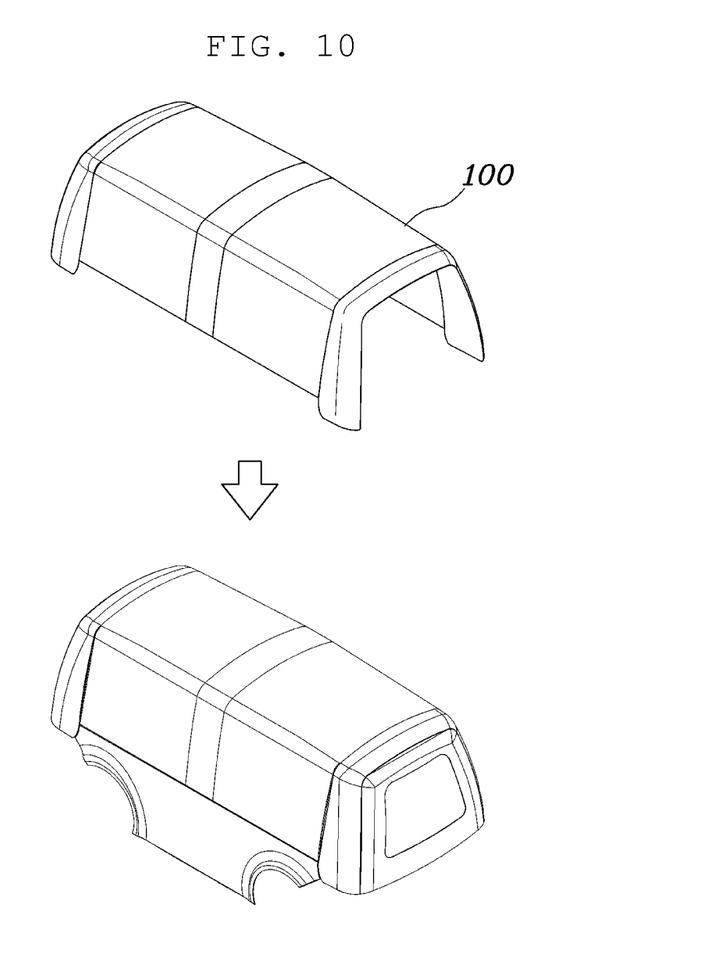
FIG. 10 is a view showing another embodiment of an outer panel included in the vehicle panel assembly according to an embodiment of the present invention.

FIG. 10 is a view showing another embodiment of the outer panel included in the vehicle panel assembly according to an embodiment of the present invention.

As shown in FIG. 10, the outer panel 100 may extend in the forward-rearward direction of the vehicle so as to cover the roof and the opposite sides of the vehicle. In this case, the outer panel may be loaded from above so as to be coupled to the vehicle, as shown in FIG. 10. In the vehicle having the above structure, a door may be formed at the front or the rear of the vehicle.

In the panel assembly of the vehicle, the respective panels are coupled to each other by fitting, and are coupled to the vehicle body by bolting or riveting. In this assembly method, the respective panels are manufactured and are transported to a smart factory. In the smart factory, in which a manufacturing process, such as a pressing process and a painting process, is not performed, the vehicle is manufactured through simple coupling, such as fitting, bolting, or riveting. The manufactured vehicle is transported to a customer. Consequently, the manufacturing process may be simplified, whereby manufacturing cost may be minimized.

As is apparent from the above description, in a vehicle panel assembly according to embodiments of the present invention, a second outer assembly portion may be coupled to a second inner assembly portion in the state in which the second outer assembly portion is exactly located at the position of the second inner assembly portion, and downward loading of the second outer assembly portion may be guided by a guide portion, whereby a first outer assembly portion may also be exactly located at the position of a first inner assembly portion. Consequently, work convenience and work efficiency may be improved when a worker couples an inner panel and an outer panel to each other.

In addition, since an upper part and a side part of the outer panel are integrally formed, no fitting line may be formed between the upper part and the side part, whereby aesthetics may be improved. Furthermore, since no fitting line is formed, introduction of foreign matter into a vehicle may be prevented.

In addition, since the upper part and the side part of the outer panel are integrally formed, the number of parts may be reduced, whereby cost reduction may be achieved and work efficiency may be improved.

Although specific embodiments of the present invention have been shown and described above, it will be apparent to those skilled in the art that various modifications and variations can be made in the present invention without departing from the technical idea of the present invention defined by the appended claims.

What is claimed is:

1. A vehicle panel assembly comprising:
   an inner panel configured to wrap a roof and opposite pillars of a vehicle body, the inner panel comprising a first inner assembly portion provided at a roof-side upper part and a second inner assembly portion provided at pillar-side opposite side parts and a guide portion provided at an upper side of the second inner assembly portion; and
   an outer panel configured to be loaded from above the inner panel and coupled to the inner panel to wrap an outside of the inner panel, the outer panel comprising a first outer assembly portion provided at an upper part and a second outer assembly portion provided at a side part, the second outer assembly portion configured to be guided downwards by the guide portion when loaded from above and facing the second inner assembly portion after loading, wherein the second outer assembly portion is fastened to the second inner assembly portion,
   wherein the guide portion and the second inner assembly portion are integrally formed, and wherein the second outer assembly portion that is separated downwards from the guide portion as a result of sliding therefrom is located so as to correspond to the second inner assembly portion.

2. The vehicle panel assembly according to claim 1, wherein:
   the first inner assembly portion comprises a first insertion recess; and
   the first outer assembly portion comprises a first coupling protrusion configured to be inserted into and coupled to the first insertion recess.

3. The vehicle panel assembly according to claim 1, wherein the first outer assembly portion is configured to be fastened to the first inner assembly portion.

4. The vehicle panel assembly according to claim 1, wherein the second inner assembly portion is provided on a lower end thereof with a projecting portion provided to project outwards, and wherein the second outer assembly portion guided by the guide portion and separated downwards is prevented from being separated under the second inner assembly portion.

5. The vehicle panel assembly according to claim 1, wherein:
   an upper part and the side part of the outer panel are integrally formed; and
   the side part and the upper part of the outer panel widen from each other by a predetermined angle or more.

6. The vehicle panel assembly according to claim 1, wherein:
   the guide portion and the second inner assembly portion are provided at a side surface of an inner plate in an upward-downward direction in plural; and
   the guide portion and the second inner assembly portion located below project outwards farther than the guide portion and the second inner assembly portion located above.

7. The vehicle panel assembly according to claim 1, wherein:
   the guide portion comprises a guide groove depressed in a sliding direction of the second outer assembly portion extending outwards; and the second outer assembly portion is configured to be inserted into the guide groove and slid therealong.

8. The vehicle panel assembly according to claim 1, wherein:
the second inner assembly portion comprises a second insertion recess; and
the second outer assembly portion comprises a second coupling protrusion configured to be inserted into and coupled to the second insertion recess.

9. The vehicle panel assembly according to claim 8, wherein:
the second coupling protrusion comprises a second inclined portion having a width decreased in an extension direction and a depressed portion provided at an end of the second inclined portion so as to be depressed inwards;
the second coupling protrusion is inserted into the second insertion recess along the second inclined portion and is caught by the depressed portion;
the second outer assembly portion comprises an elastic rib extending inwards from an inside of the depressed portion, the elastic rib being configured to apply elastic force to the depressed portion located outside thereof; and
the second outer assembly portion comprises a restriction portion extending from an end of the depressed portion in a direction intersecting an extension direction of the second outer assembly portion, the restriction portion being configured to restrict insertion of the second outer assembly portion.

10. The vehicle panel assembly according to claim 1, wherein:
the first inner assembly portion comprises a first insertion recess; and
the a first outer assembly portion comprises a first coupling protrusion configured to be inserted into and coupled to the first insertion recess.

11. A vehicle comprising:
a vehicle body comprising a roof, an upper body, and a lower body coupled to the upper body, wherein the upper body comprises a plurality of pillars extending in a vertical direction;
an inner panel wrapping the roof and opposite pillars of the plurality of pillars, the inner panel comprising a first inner assembly portion provided at a roof-side upper part and a second inner assembly portion provided at pillar-side opposite side parts and a guide portion provided at an upper side of the second inner assembly portion; and
an outer panel coupled to the inner panel to wrap an outside of the inner panel, the outer panel comprising a first outer assembly portion provided at an upper part and a second outer assembly portion provided at a side part, the second outer assembly portion configured to be guided downwards by the guide portion when loaded from above and facing the second inner assembly portion after loading, wherein the second outer assembly portion is fastened to the second inner assembly portion,
wherein the guide portion and the second inner assembly portion are integrally formed, and wherein the second outer assembly portion that is separated downwards from the guide portion as a result of sliding therefrom is located so as to correspond to the second inner assembly portion.

12. The vehicle according to claim 11, wherein:
the first inner assembly portion comprises a first insertion recess; and
the first outer assembly portion comprises a first coupling protrusion inserted into and coupled to the first insertion recess.

13. The vehicle according to claim 11, wherein the first outer assembly portion is fastened to the first inner assembly portion.

14. The vehicle according to claim 11, wherein the second inner assembly portion is provided on a lower end thereof with a projecting portion provided to project outwards, and wherein the second outer assembly portion guided by the guide portion and separated downwards is prevented from being separated under the second inner assembly portion.

15. The vehicle according to claim 11, wherein:
an upper part and the side part of the outer panel are integrally formed; and
the side part and the upper part of the outer panel widen from each other by a predetermined angle or more.

16. The vehicle according to claim 11, wherein:
the guide portion and the second inner assembly portion are provided at a side surface of an inner plate in an upward-downward direction in plural; and
the guide portion and the second inner assembly portion located below project outwards farther than the guide portion and the second inner assembly portion located above.

17. The vehicle according to claim 11, wherein:
the guide portion comprises a guide groove depressed in a sliding direction of the second outer assembly portion extending outwards; and
the second outer assembly portion is inserted into the guide groove and configured to be slid therealong.

18. The vehicle according to claim 11, wherein:
the second inner assembly portion comprises a second insertion recess; and
the second outer assembly portion comprises a second coupling protrusion inserted into and coupled to the second insertion recess.

19. The vehicle according to claim 18, wherein:
the second coupling protrusion comprises a second inclined portion having a width decreased in an extension direction and a depressed portion provided at an end of the second inclined portion so as to be depressed inwards;
the second coupling protrusion is inserted into the second insertion recess along the second inclined portion and is caught by the depressed portion;
the second outer assembly portion comprises an elastic rib extending inwards from an inside of the depressed portion, the elastic rib being configured to apply elastic force to the depressed portion located outside thereof; and
the second outer assembly portion comprises a restriction portion extending from an end of the depressed portion in a direction intersecting an extension direction of the second outer assembly portion, the restriction portion being configured to restrict insertion of the second outer assembly portion.

20. A vehicle panel assembly comprising:
an inner panel configured to wrap a roof and opposite pillars of a vehicle body, the inner panel comprising a first inner assembly portion provided at a roof-side upper part and a second inner assembly portion provided at pillar-side opposite side parts and a guide portion provided at an upper side of the second inner assembly portion; and an outer panel configured to be loaded from above the inner panel and coupled to the inner panel to wrap an outside of the inner panel, the outer panel comprising a first outer assembly portion provided at an upper part and a second outer assembly portion provided at a side part, the second outer assembly portion configured to be guided downwards by the guide portion when loaded from above and facing the second inner assembly portion after loading, wherein the second outer assembly portion is fastened to the second inner assembly portion;

wherein the guide portion and the second inner assembly portion are provided at a side surface of an inner plate in an upward-downward direction in plural; and wherein the guide portion and the second inner assembly portion located below project outwards farther than the guide portion and the second inner assembly portion located above.

\* \* \* \* \*

UNITED STATES PATENT AND TRADEMARK OFFICE
CERTIFICATE OF CORRECTION

| | | |
|---|---|---|
| PATENT NO. | : 11,912,222 B2 | Page 1 of 1 |
| APPLICATION NO. | : 18/049311 | |
| DATED | : February 27, 2024 | |
| INVENTOR(S) | : Hyun Cheol Yun et al. | |

It is certified that error appears in the above-identified patent and that said Letters Patent is hereby corrected as shown below:

In the Claims

In Column 13, Line 36, Claim No. 10:
Change "the a first outer assembly portion" to --the first outer assembly portion--

Signed and Sealed this
Thirtieth Day of April, 2024

Katherine Kelly Vidal
*Director of the United States Patent and Trademark Office*